(12) United States Patent  (10) Patent No.: US 7,559,500 B2
Hiraguchi  (45) Date of Patent: Jul. 14, 2009

(54) RECORDING TAPE CARTRIDGE

(75) Inventor: Kazuo Hiraguchi, Odawara (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 12/039,452

(22) Filed: Feb. 28, 2008

(65) Prior Publication Data

US 2008/0210801 A1    Sep. 4, 2008

(30) Foreign Application Priority Data

Mar. 2, 2007  (JP) .............................. 2007-052996

(51) Int. Cl.
*G11B 23/107*  (2006.01)
(52) U.S. Cl. ................. 242/348.2; 242/332.4
(58) Field of Classification Search ............... 242/348, 242/348.2, 332, 332.2, 332.4, 532.1, 582; 360/132
See application file for complete search history.

(56) References Cited

U.S. PATENT DOCUMENTS 6,505,789 B2* 1/2003 Ridl et al. ................ 242/348.2
6,648,259 B1* 11/2003 Shiga et al. .............. 242/348.2
6,663,035 B2* 12/2003 Shiga et al. .............. 242/348.2
6,691,941 B2* 2/2004 Imai ........................ 242/332.4
6,918,556 B2* 7/2005 Ishihara ................... 242/348.2
6,938,848 B2* 9/2005 Morita et al. ............. 242/332.4
6,981,669 B2* 1/2006 Ishihara et al. ........... 242/348.2
7,063,287 B2* 6/2006 Shiga et al. .............. 242/348.2
7,475,839 B2* 1/2009 Hiraguchi et al. ........ 242/348.2

FOREIGN PATENT DOCUMENTS

JP            200487096 A       3/2004

* cited by examiner

*Primary Examiner*—William A Rivera
(74) *Attorney, Agent, or Firm*—Sughrue Mion, PLLC (57) ABSTRACT

A leader pin is attached to an end portion of recording tape housed in a recording tape cartridge, and an opening for allowing the leader pin to be pulled out is formed in a side wall of a case. Holding portions that hold the leader pin are formed in the vicinity of the opening in the case. The leader pin includes, on both ends of a body portion, large diameter portions and flange portions disposed via neck portions on the large diameter portions. The holding portions include slit portions that open towards the opening and into which the neck portions enter, first concave portions that house the large diameter portions, and second concave portions that house the flange portions. The outer diameter of the flange portions of the leader pin is formed so as to be smaller than the outer diameter of the large diameter portions.

8 Claims, 10 Drawing Sheets

RECORDING TAPE CARTRIDGE

CROSS-REFERENCE TO RELATED APPLICATION

This application claims priority under 35 USC 119 from Japanese Patent Application No. 2007-052996, the disclosure of which is incorporated by reference herein.

BACKGROUND OF THE INVENTION

1. Field of the Invention

The present invention relates to a recording tape cartridge that houses, inside a case, a single reel onto which is wound recording tape such as magnetic tape used as a recording and playback medium mainly for computers and the like.

2. Description of the Related Art

Conventionally, recording tape cartridges have been known where recording tape such as magnetic tape used as a data recording and playback medium for computers and the like is wound onto a single reel and the reel is housed inside a case. A leader member that a pullout member of a drive device pulls out is fixedly attached to a distal end of the recording tape. As an example of the leader member, there is a substantially dumbbell-shaped leader pin that includes a body portion to which the recording tape is fixedly attached, with large diameter portions whose diameters are larger than that of the body portion being disposed on both ends of the body portion.

The leader pin is held, such that its axial direction is in the height direction of the case, as a result of the large diameter portions being housed in concave pin holding portions formed in a top plate and a bottom plate of the case in the vicinity of an opening. Consequently, when shock is imparted to the vicinity of the opening as a result of the recording tape cartridge being dropped or the like and the case bends in the vertical direction, there is the potential for the large diameter portions to come out of the pin holding portions.

For that reason, a recording tape cartridge has been disclosed in Japanese Patent Application Publication No. 2004-87096, for example, where slit portions are disposed in the pin holding portions disposed in the top plate and the bottom plate of the case, flange portions are disposed via neck portions on the large diameter portions of the leader pin, and the neck portions are inserted into the slit portions, whereby the top plate and the bottom plate are respectively held by the flange portions and the large diameter portions.

When the recording tape cartridge is configured in this manner, the leader pin admittedly does not come out of the pin holding portions even when shock resulting from the recording tape cartridge being dropped or the like is imparted. However, when the leader pin is returned to the pin holding portions by the pullout member of the drive device after recording or playback by the drive device, if the leader pin is returned in a state where it is slanted in the traveling direction, the flange portions end up catching on the top plate or the bottom plate of the case, and a drawback arises in that the leader pin becomes unable to be housed in the pin holding portions.

SUMMARY OF THE INVENTION

Thus, in view of this problem, it is an object of the present invention to obtain a recording tape cartridge where, when a leader pin having flange portions disposed via neck portions on both ends is returned to holding portions of a case disposed with slit portions that the neck portions enter, even when the leader pin is slanted in the traveling direction, the leader pin can be returned to a predetermined position in the holding portions.

In order to achieve this object, a recording tape cartridge of a first aspect of the present invention includes: a case that rotatably houses a single reel onto which is wound recording tape having a leader pin attached to an end portion thereof, which case includes a side wall at which is formed an opening for allowing the leader pin to be pulled out; and holding portions that are formed at a top plate and a bottom plate of the case and which hold the leader pin in the vicinity of the opening, wherein: the leader pin includes, at both ends of a body portion, large diameter portions having an outer diameter that is larger than the outer diameter of the body portion and flange portions disposed at the large diameter portions via neck portions having an outer diameter that is smaller than the outer diameter of the large diameter portions; the holding portions include slit portions that open towards the opening and into which the neck portions are capable of entering, first concave portions that are formed at inner surface sides of the slit portions and which are configured to house the large diameter portions, and second concave portions that are formed at outer surface sides of the slit portions and which are configured to house the flange portions; and the flange portions are formed so as to have an outer diameter that is smaller than the outer diameter of the large diameter portions, so that the leader pin is configured to be housed in the holding portions when the leader pin is returned to the holding portions in a state in which the leader pin is slanted at a predetermined angle with respect to a take-up direction of the recording tape.

According to the recording tape cartridge of the first aspect of the invention, when the leader pin having the flange portions disposed via the neck portions on the outer end surfaces of the large diameter portions is returned to the holding portions, even in a state where the leader pin is slanted a predetermined angle in the traveling direction thereof, the flange portions do not catch on the top plate or the bottom plate of the case, and the leader pin can be reliably returned to a predetermined position in the holding portions.

Further, in the recording tape cartridge of the first aspect of the invention, the sides of the slit portions facing the opening may be configured to become larger in a tapered manner.

According to the recording tape cartridge of this configuration, even when the position of the leader pin having the flange portions disposed via the neck portions on the outer end surfaces of the large diameter portions shifts in a direction orthogonal to the traveling direction thereof, the leader pin can be guided and returned to the holding portions.

As described above, according to the present invention, there can be provided a recording tape cartridge where, when a leader pin having flange portions disposed via neck portions on both ends is returned to holding portions of a case disposed with slit portions that the neck portions enter, even when the leader pin is slanted in the traveling direction, the leader pin can be returned to a predetermined position in the holding portions.

DETAILED DESCRIPTION OF THE INVENTION

Below, the best mode for implementing the present invention will be described in detail on the basis of an embodiment shown in the drawings. For the convenience of description, in FIG. 1, arrow A will represent the direction in which a recording tape cartridge 10 is loaded into a drive device and be referred to as a front direction (front side) of the recording tape cartridge 10. Additionally, the direction of arrow B, which is orthogonal to the direction of arrow A, will be referred to as a right direction (right side).

Figure 1:
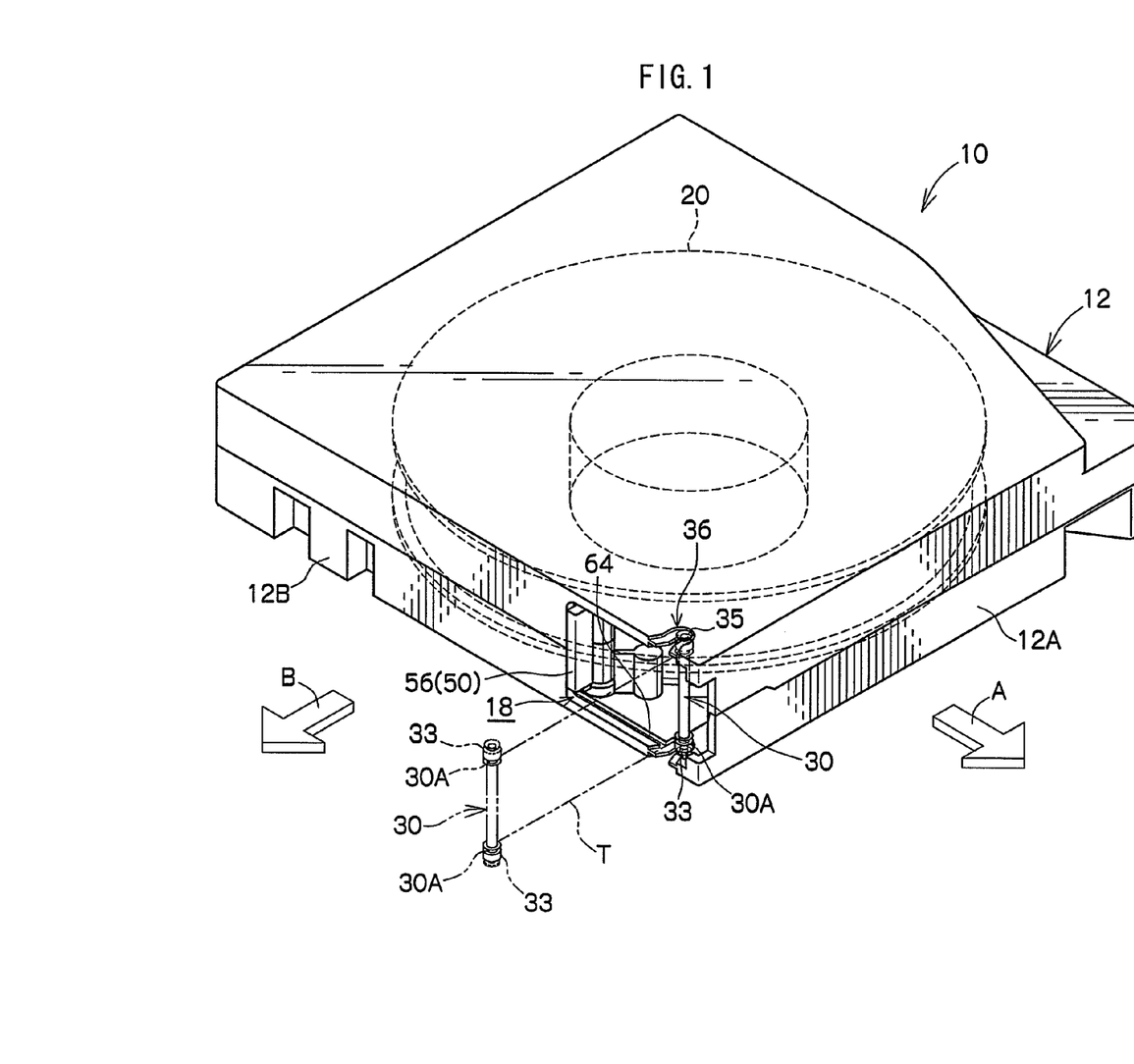
FIG. 1 is a general perspective view of a recording tape cartridge.
Figure 2:
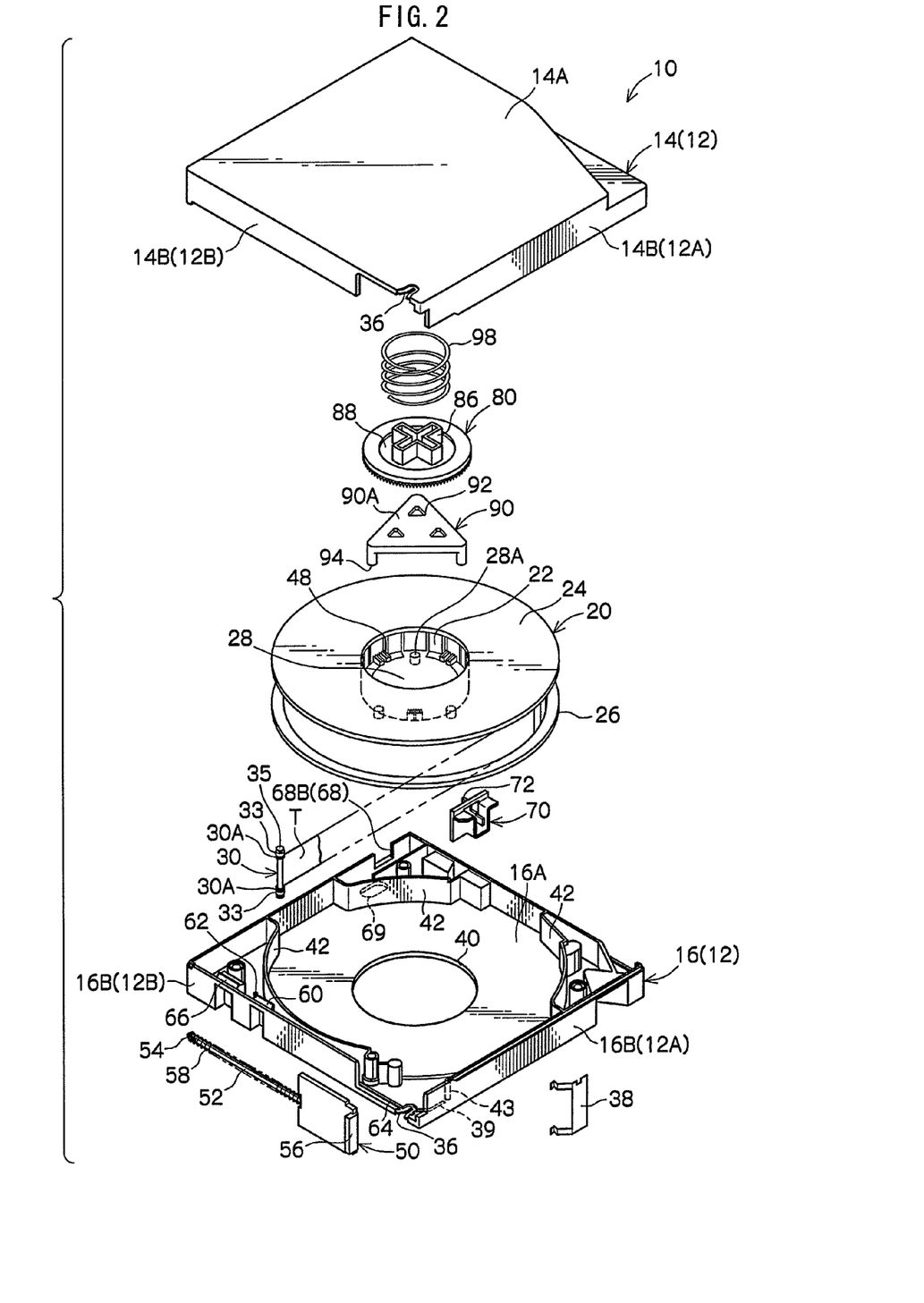
FIG. 2 is a general exploded perspective view of the recording tape cartridge as seen from above.
Figure 3:
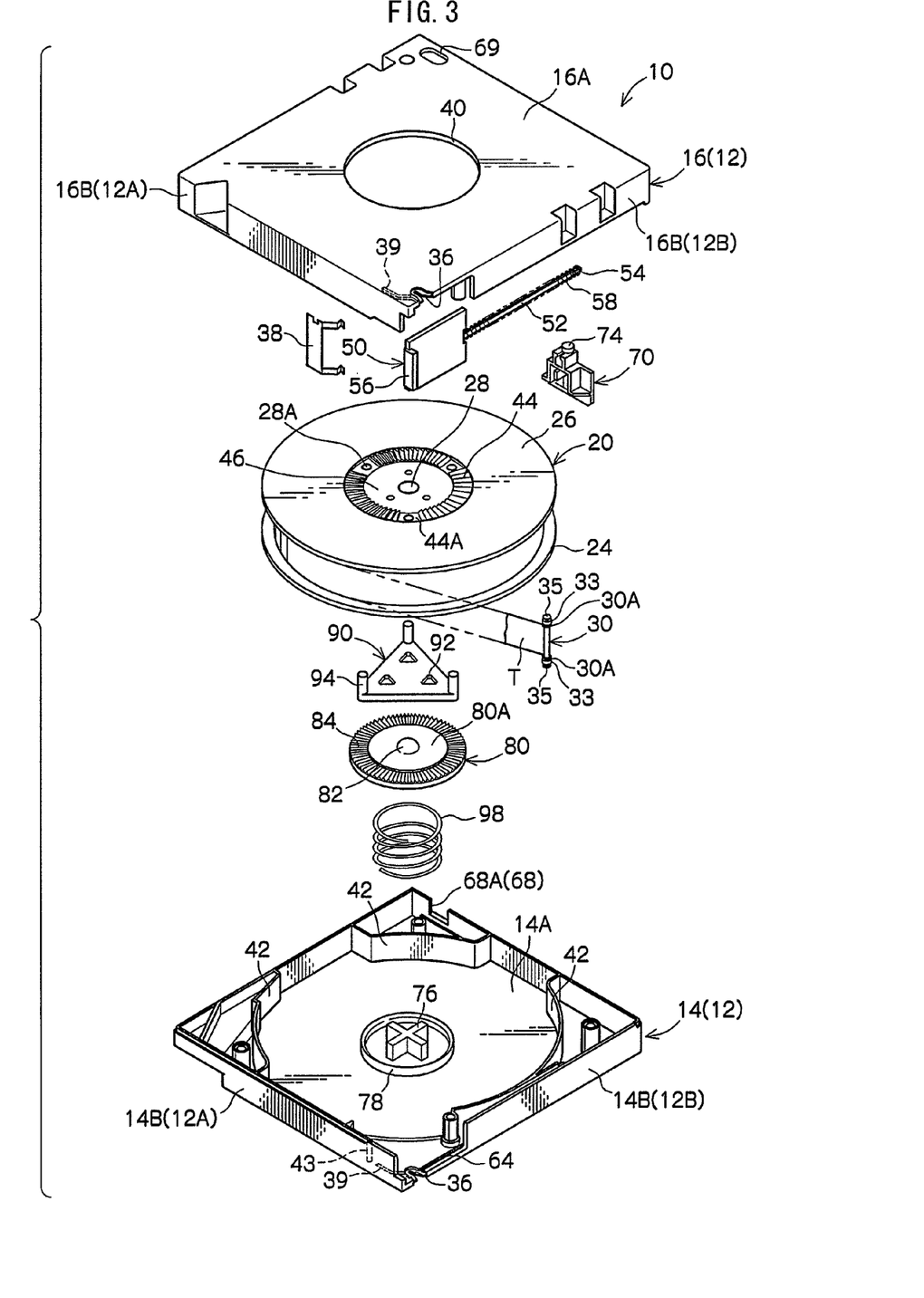
FIG. 3 is a general exploded perspective view of the recording tape cartridge as seen from below.

As shown in FIG. 1 to FIG. 3, the recording tape cartridge 10 includes a case 12 that has a substantially rectangular box-like shape. The case 12 includes an upper case 14 and a lower case 16 made of a resin such as polycarbonate (PC). The upper case 14 is configured by a top plate 14A and a peripheral wall 14B that is disposed upright along the peripheral edge of the top plate 14A. The lower case 16 is configured by a bottom plate 16A and a peripheral wall 16B that is disposed upright along the peripheral edge of the bottom plate 16A. The case 12 is configured as a result of the upper case 14 and the lower case 16 being joined together by screwing and ultrasonic welding in a state where the peripheral wall 14B and the peripheral wall 16B have been brought into contact with each other. It will be noted that the resin material that forms the case 12 is not limited to PC, but it is preferable for the bending elastic modulus of the case 12 to be 2000 MPa to 4000 MPa.

When the bending elastic modulus of the case 12 is less than 2000 MPa, strength with respect to shock imparted as a result of the recording tape cartridge 10 being dropped or the like is insufficient, a distance S between later-described slit portions 37 becomes extremely narrow, and there is the potential for a drawback to arise where a leader pin 30 becomes unable to be pulled out from the recording tape cartridge 10. Further, when the bending elastic modulus of the case 12 is greater than 4000 MPa, there is the potential not only for plastic deformation and elastic deformation but also cracks and damage to occur in the case 12 due to shock imparted as a result of the recording tape cartridge 10 being dropped or the like. Consequently, the bending elastic modulus of the case 12 of the present embodiment is 2000 MPa to 4000 MPa.

Just one reel 20 is rotatably housed inside the case 12. The reel 20 is configured by a bottomed circular cylinder-shaped reel hub 22 that configures the axial center portion of the reel 20, a lower flange 26 that is disposed on and molded integrally with the lower end portion of the reel hub 22, and an upper flange 24 that is ultrasonically welded to the upper end portion of the reel hub 22. Additionally, recording tape T such as magnetic tape serving as an information recording and playback medium is wound around the outer peripheral surface of the reel hub 22, and the width direction edges of the recording tape T wound around the reel hub 22 are held by the upper flange 24 and the lower flange 26.

Further, a reel gear 44 is annularly formed in the undersurface of a bottom wall 28 of the reel hub 22. That is, areas 44A with no teeth are partially formed at plural places (in the drawings, at three places separated by 120° intervals) on the reel gear 44, and through holes 28A through which leg portions 94 of a later-described release member 90 are inserted are formed in the bottom wall 28 in the areas 44A with no teeth.

Further, a gear opening 40 for exposing the reel gear 44 to the outside is disposed in the center portion of the lower case 16. The reel gear 44 exposed from the gear opening 40 meshes with, and is driven to rotate by, a drive gear (not shown) formed on a rotating shaft of the drive device, whereby the reel 20 is made capable of relative rotation with respect to the case 12 inside the case 12.

It will be noted that when the recording tape cartridge 10 is not in use (when the recording tape cartridge 10 is not loaded in the drive device, such as during storage or during transport), the reel 20 is held, such that it does not rattle, by a free play limiting wall 42 that is partially disposed on, so as to project from, inner surfaces of the upper case 14 and the lower case 16 and which serves as an inner wall on a circular locus coaxial with the gear opening 40.

Further, a reel plate 46 that is an annular metal plate made of a magnetic material is fixedly attached, by insert molding, coaxially and integrally to the undersurface of the bottom wall 28 on the radial direction inner side of the reel gear 44. The reel plate 46 is configured to be attracted and held by the magnetic force of an annular magnet (not shown) disposed in the rotating shaft of the drive device.

Further, an opening 18 for allowing the recording tape T wound onto the reel 20 to be pulled out is formed in a right wall 12B of the case 12. A leader pin 30 that is locked (engaged) and pulled out by a pullout member (not shown) of the drive device is fixedly attached to a free end portion of the recording tape T pulled out from the opening 18.

Additionally, a pair of upper and lower pin holding portions 36 that position and hold the leader pin 30 inside the case 12 are disposed inside the opening 18 in the case 12—that is, in the inner surface of the top plate 14A of the upper case 14 and in the inner surface of the bottom plate 16A of the lower case 16. The configuration of the vicinity of the opening 18 including the leader pin 30 and the pin holding portions 36 will be described in detail later.

Further, the opening 18 is opened and closed by a door 50. The door 50 is formed in a substantially rectangular plate-like shape of a size capable of blocking the opening 18, and groove portions 64 that allow the upper and lower end portions of the door 50 to slidably fit therein are formed in the top plate 14A and the bottom plate 16A inside the opening 18 so that the door 50 can move along the right wall 12B of the case 12.

Further, a shaft 52 is disposed on, so as to project from, the center of the rear end portion of the door 50, and a coil spring 58 is fitted over the shaft 52. Additionally, an enlarged portion 54 that prevents the coil spring 58 from coming off is formed on the rear end of the shaft 52. Further, a support table 60 including a locking portion 62 that locks the rear end of the coil spring 58 fitted over the shaft 52 is disposed on, so as to project from, the lower case 16.

Consequently, the shaft 52 is slidably supported on the support table 60 and the rear end of the coil spring 58 is locked by the locking portion 62, whereby the door 50 is always biased by the biasing force of the coil spring 58 in the direction in which the door 50 blocks the opening 18. It will be noted that it is preferable to further projectingly dispose, on the rear side of the support table 60, a support table 66 that supports the shaft 52 when the opening 18 is open.

Further, a tongue 56 for opening and closing the door 50 is disposed on the front end portion of the door 50 so as to project outward. The tongue 56 is configured to engage with an opening/closing member (not shown) of the drive device in accompaniment with the loading of the recording tape cartridge 10 into the drive device. Thus, the door 50 is opened counter to the biasing force of the coil spring 58.

Further, as shown in FIG. 2 and FIG. 3, a write-protect portion 70 that enables or disables recording on the recording tape T is disposed, so as to be slidable in left and right directions, in the left rear portion of the case 12. A clear hole 68 that allows an operational projection 72 for manually operating the write-protect portion 70 to project therefrom is formed in the rear wall of the case 12. The clear hole 68 is formed by a cutout portion 68A that is formed in the peripheral wall 14B of the upper case 14 and a cutout portion 68B that is formed in the peripheral wall 16B of the lower case 16 when the upper case 14 and the lower case 16 are joined together.

Moreover, an elongate hole 69 from which a projecting portion 74 of the write-protect portion 70 is exposed is formed in the lower case 16 so as to be long in the left-right direction. When the recording tape cartridge 10 is loaded into the drive device, the drive device detects the position of the write-protect portion 70, so that whether or not recording on the recording tape T is enabled is automatically judged. It will be noted that the projecting portion 74 does not project from the undersurface of the lower case 16.

Further, engagement gears 48 are disposed plurally at predetermined intervals (e.g., three separated by 120° intervals) upright on the peripheral edge of the upper surface of the bottom wall 28 of the reel hub 22, and the through holes 28A that allow the leg portions 94 of the later-described release member 90 to be inserted therethrough are disposed plurally (in this instance, three separated by 120° intervals) at predetermined positions on the reel gear 44 between the engagement gears 48. Additionally, a disc-shaped brake member 80 molded by a resin material is insertingly disposed inside the reel hub 22.

A brake gear 84 capable of meshing with the engagement gears 48 is annularly formed on the peripheral edge of an undersurface 80A of the brake member 80, and an engagement projection 86 that is substantially cross-shaped when seen in plan view and into which is inserted a rotation limiting rib 76 that is substantially cross-shaped when seen in plan view and projects downward from the inner surface of the top plate 14A of the upper case 14 is disposed upright on the upper surface of the brake member 80 so as to be slightly higher than the height of the rotation limiting rib 76. Thus, the brake member 80 is configured to be incapable of rotating with respect to the case 12 (the upper case 14) and to be movable up and down inside the reel hub 22.

Further, a compression coil spring 98 is disposed between the upper case 14 and the brake member 80. That is, the compression coil spring 98 is disposed in a state where one end thereof contacts the inner side of an annular projection 78 (between the rotation limiting rib 76 and the annular projection 78) disposed on the outer side of the rotation limiting rib 76 so as to project from the upper case 14 and where the other end thereof contacts the inside of an annular groove 88 disposed in the upper surface of the brake member 80. Thus, the brake member 80 is always biased downward by the biasing force of the compression coil spring 98.

Consequently, when the recording tape cartridge 10 is not in use (when the recording tape cartridge 10 is not loaded in the drive device), the brake gear 84 always meshes with the engagement gears 48, and the reel 20 is placed in a rotationally locked state where relative rotation of the reel 20 with respect to the case 12 is deterred. At this time, the reel 20 is pushed against the lower case 16 by this biasing force to cause the reel gear 44 to be exposed from the gear opening 40.

Further, a release member 90 that has an equilateral triangle shape when seen in plan view and is molded by a resin material is disposed inside the reel hub 22 on the underside of the brake member 80 (between the bottom wall 28 and the brake member 80). Through holes 92 having a predetermined shape are plurally disposed (those shown in the drawings comprise three and have a hexagonal shape) at predetermined positions in the release member 90, so that the release member 90 is lightweight.

Further, the leg portions 94 that are inserted through the through holes 28A formed in the bottom wall 28 and project a predetermined height on the reel gear 44 from the undersurface of the bottom wall 28 (the reel plate 46) are disposed on, so as to project from, the undersurface of the release member 90 and at the vertex portions thereof. Additionally, a substantially hemispherical release projection 82 that is disposed on, so as to project from, the center of the undersurface 80A of the brake member 80, contacts the center of a planar upper surface 90A of the release member 90.

By configuring the recording tape cartridge 10 in this manner, the area of contact between the brake member 80 and the release member 90 is reduced as much as possible, and sliding resistance during use (when the reel 20 rotates) is alleviated as much as possible. It will be noted that POM (polyacetal), for example, is used as the material of the brake member 80 and that PBT (polybutylene terephthalate), for example, is used as the material of the release member 90.

Figure 4:
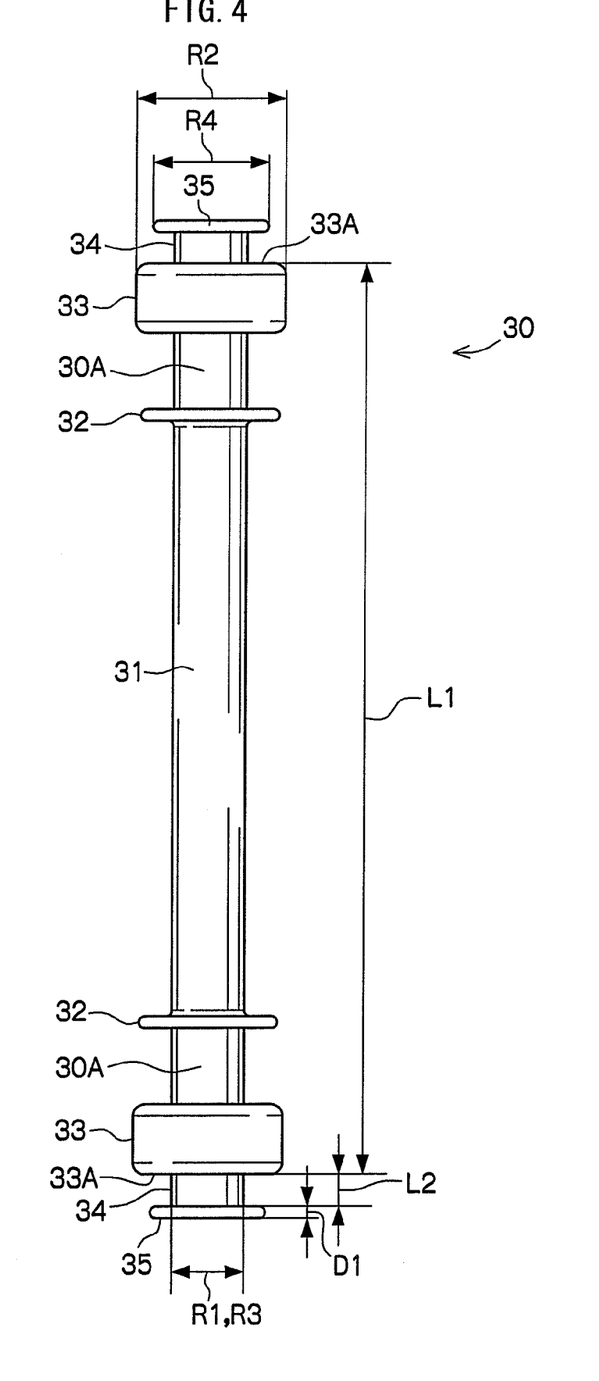
FIG. 4 is a general side view of a leader pin.

Next, the configuration of the vicinity of the opening 18 including the leader pin 30 and the pin holding portions 36 pertaining to the present invention will be described in detail on the basis of FIG. 4 to FIG. 6. First, the leader pin 30 will be described. The leader pin 30 is made of metal or resin and, as shown in FIG. 4, includes: a circular column-shaped body portion 31 to which the end portion of the recording tape T is fixedly attached; first flange portions 32 disposed on both axial direction outer sides of the body portion 31; circular column-shaped large diameter portions 33 that have a predetermined thickness, are disposed on both axial direction outer sides of the first flange portions 32, and have an outer diameter R2 that is larger than an outer diameter R1 of the body portion 31; circular column-shaped neck portions 34 that are disposed on both axial direction outer end surfaces 33A of the large diameter portions 33 and have an outer diameter R3 that is equal to (or smaller than) the outer diameter R1 of the body portion 31; and disc-shaped second flange portions 35 that are disposed on both axial direction outer end surfaces of the neck portions 34 and have an outer diameter R4 that is smaller than the outer diameter R2 of the large diameter portions 33 and is larger than the outer diameter R3 of the neck portions 34 (the outer diameter R1 of the body portion 31).

The free end portion of the recording tape T is fixedly attached between the first flange portions 32. Additionally, annular grooves 30A into which hooks (not shown) or the like of the pullout member of the drive device lock are formed between the first flange portions 32 and the large diameter portions 33. Thus, the hooks or the like do not contact and damage the recording tape T when the pullout member pulls out the recording tape T.

Figure 5:
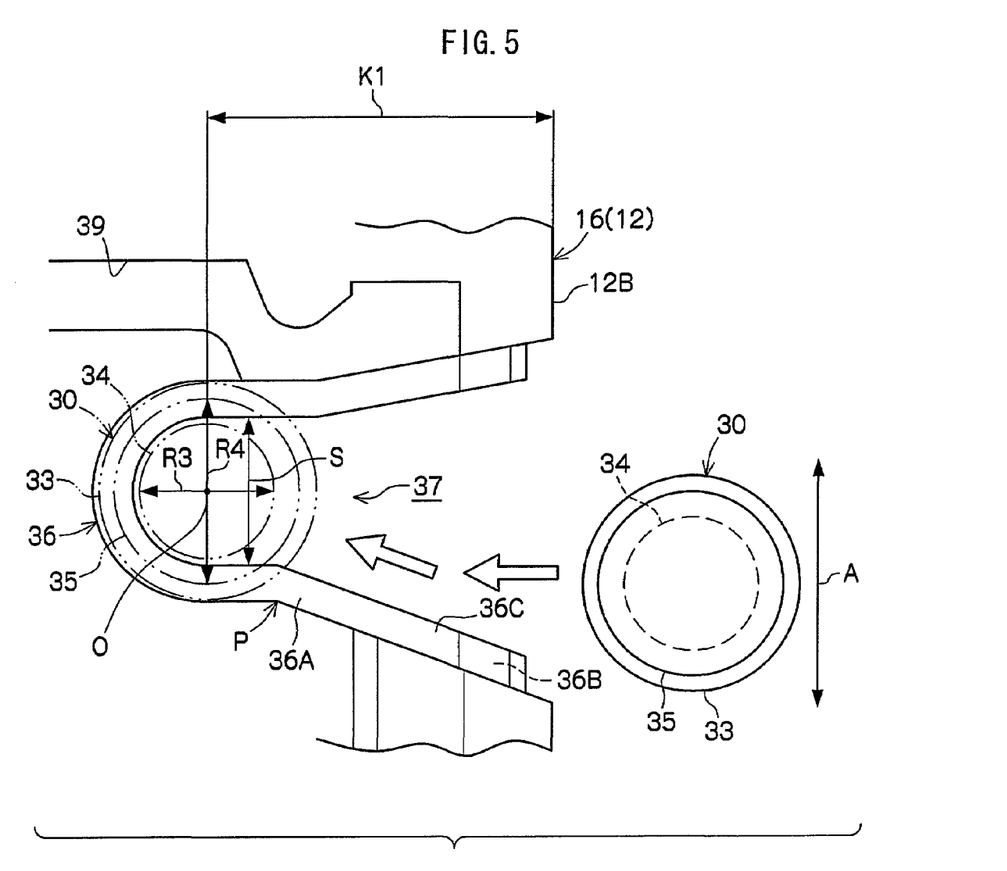
FIG. 5 is an enlarged general plan view showing the vicinity of an opening.
Figure 6:
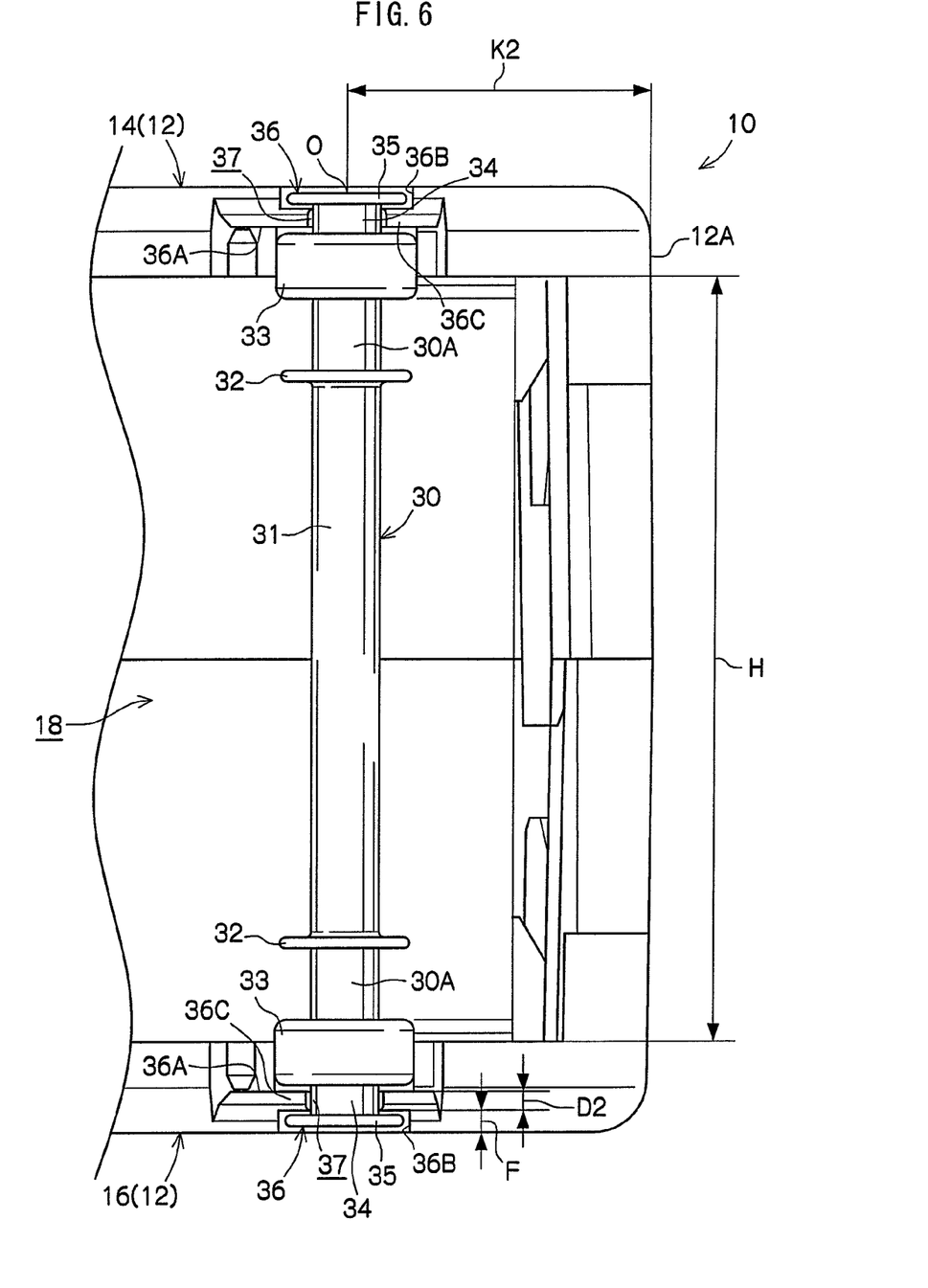
FIG. 6 is an enlarged general side view showing the vicinity of the opening.

As shown in FIG. 5 and FIG. 6, the pin holding portions 36 include, in the inner surfaces of the case 12 (in the inner surface of the upper case 14 and in the inner surface of the lower case 16), concave portions 36A that are substantially U-shaped when seen in plan view and whose sides in the direction in which the recording tape T is pulled out are open. Concave portions 36B that are substantially U-shaped when seen in plan view and whose sides in the direction in which the recording tape T is pulled out are open are formed in the outer surfaces of the case 12 (in the outer surface of the upper case 14 and in the outer surface of the lower case 16) corresponding top and bottom with the concave portions 36A.

Additionally, substantially elongate hole-shaped slit portions 37 that are communicated with the opening 18 are formed inside the concave portions 36A and 36B. In other words, the concave portions 36A are formed around the inner surface sides of the slit portions 37, the concave portions 36B are formed around the outer surface sides of the slit portions 37, and thin portions 36C that are substantially U-shaped when seen in plan view are formed by the concave portions 36A and 36B.

As shown in FIG. 5, the slit portions 37 are formed such that they become larger in a tapered manner towards the opening 18 from predetermined positions P on the outer sides of the second flange portions 35 when seen in plan view when the leader pin 30 is held in the pin holding portions 36. That is, the sides of the concave portions 36A and 36B and the thin portions 36C facing the opening 18 are formed such that they become larger in a tapered manner. Thus, even when the position of the leader pin 30 is shifted in a direction (the direction indicated by arrow A in FIG. 5) orthogonal to its traveling direction, the leader pin 30 is reliably returned (guided) to the pin holding portions 36.

Further, a distance S in the direction of arrow A between the portions of the slit portions 37 that do not become larger in a tapered manner is formed so as to be larger than the outer diameter R3 of the neck portions 34 (the outer diameter R1 of the body portion 31) and smaller than the outer diameter R4 of the second flange portions 35. Consequently, when the leader pin 30 in an upright state is to be held in the pin holding portions 36, the neck portions 34 thereof enter (move into) the slit portions 37, the large diameter portions 33 become housed inside the concave portions 36A, and the second flange portions 35 become housed inside the concave portions 36B. That is, the thin portions 36C between the concave portions 36A and the concave portions 36B are inserted between the large diameter portions 33 and the second flange portions 35.

Consequently, a length L2 of the neck portions 34 (the distance between the large diameter portions 33 and the second flange portions 35) is formed so as to be a predetermined amount larger than a plate thickness D2 of the thin portions 36C. Further, a depth F of the concave portions 36B is configured to be a depth where, when the leader pin 30 is locked and held in the case 12, the second flange portions 35 that are the top and bottom endmost portions of the leader pin 30 do not project from the outer surfaces of the case 12 when seen in side view. In other words, the depth F of the concave portions 36B is configured to be equal to or greater than a plate thickness D1 of the second flange portions 35, so the length of the entire leader pin 30 including the second flange portions 35 is substantially equal to the height of the entire case 12 (see FIG. 6).

Thus, the leader pin 30 can function as a supportive coupling member disposed so as to join together the upper case 14 and the lower case 16, so it becomes possible to raise the strength of the case 12. That is, even if the opening 18 portion of the case 12 tries to flexurally deform vertically outward because of shock when the recording tape cartridge 10 is dropped or the like, that flexural deformation can be controlled by the leader pin 30 because the leader pin 30 is disposed in the opening 18 portion of the case 12 so as to join together the upper case 14 and the lower case 16. Thus, the leader pin 30 can be prevented from falling out of the pin holding portions 36.

As shown in FIG. 2 and FIG. 3, screw bosses 43 are disposed in the upper case 14 and the lower case 16 at positions inside the front wall 12A and at the shortest distance of about 20 mm from the opening 18, and those sites are screwed. Consequently, the upper case 14 and the lower case 16 are more strongly joined together in the vicinity of the opening 18, and flexural deformation resulting from shock when the recording tape cartridge 10 is dropped or the like is further controlled.

Further, by disposing the slit portions 37, gaps are formed which allow the inside and outside of the case 12 in the vicinity of the opening 18 to be communicated with each other, but a stopper (not shown) that is disposed on, so as to project from, the inner surface of the door 50 and which holds the leader pin 30 when the door 50 blocks the opening 18 becomes disposed on the sides of the slit portions 37 facing the opening 18, so the gaps resulting from the slit portions 37 are always blocked by the stopper when the recording tape cartridge 10 is not in use, such as during storage. Consequently, adhesion of dust and the like to the recording tape T wound onto the reel 20 is prevented.

Further, groove portions 39 are formed in the inner surfaces of the case 12 in the vicinities of the front wall 12A sides of the pin holding portions 36. A plate spring 38 comprising a metal plate that has been bent and formed is fixedly disposed as a result of top and bottom edge portions of the plate spring 38 being inserted into the groove portions 39. Additionally, two-pronged distal end portions of the plate spring 38 push the large diameter portions 33 of the leader pin 30 towards the concave portions 36A, so that the leader pin 30 does not fall out of the pin holding portions 36. It will be noted that when the leader pin 30 enters and exits the pin holding portions 36 because of the pullout member of the drive device, the distal end portions of the plate spring 38 appropriately elastically deform to allow movement of the leader pin 30.

Next, an example of the dimension of each portion of the leader pin 30 and the pin holding portions 36 having the above configuration will be specifically described. As shown in FIG. 4, the length L1 of the leader pin 30 from the outer end surface 33A of one of the large diameter portions 33 to the outer end surface 33A of the other of the large diameter portions 33 is 19.46 mm, and the outer diameter R1 of the body portion 31 is 1.6 mm. Additionally, the outer diameter R2 of the large diameter portions 33 is 3.2 mm. Further, the length L2 of the neck portions 34 is 0.7 mm, and the outer diameter R3 of the neck portions 34 is 1.6 mm, which is equal to the outer diameter R1 of the body portion 31. Moreover, the plate thickness D1 of the second flange portions 35 is 0.2 mm, and the outer diameter R4 of the second flange portions 35 is 2.2 mm.

Further, as shown in FIG. 5 and FIG. 6, a center (axial center of the held leader pin 30) O of the pin holding portions 36 is set to be in a position (called "parking position" below) where a shortest distance K1 from the right wall 12B (the opening 18) is 4.0 mm to 6.0 mm (ordinarily 5.0 mm) and a shortest distance K2 from the front wall 12A is 6.0 to 8.0 mm (ordinarily 7.0 mm), and the distance S between the portions of the slit portions 37 that do not become larger in a tapered manner is 1.8 mm. Additionally, a height H of the opening 18 is 16 mm to 20 mm.

Further, the plate thickness of the upper case 14 and the lower case 16 in a predetermined area (area equal to or greater than 40 $mm^2$ when seen in plan view) to a corner portion on the side where the opening 18 is formed from the parking position is a maximum of 2.2 mm. Additionally, the plate thickness of the upper case 14 and the lower case 16 in an area within a radius of 10 mm from the parking position is a minimum of 0.3 to 1.2 mm. When this plate thickness is less than 0.3 mm, there is the potential for the resin material to not flow during molding.

Further, the depth F of the concave portions 36B is 0.5 mm, and the plate thickness D2 of the thin portions 36C is 0.3 mm to 0.55 mm. In the present embodiment, the plate thickness D2 of the thin portions 36C is 0.4 mm. Consequently, the thin portions 36C are capable of being inserted with some leeway between the second flange portions 35 and the large diameter portions 33 (because the length L2 of the neck portions 34 is 0.7 mm). In other words, the sum of the clearance between the second flange portions 35 and the concave portions 36B and between the large diameter portions 33 and the concave portions 36A is 0.3 mm when the neck portions 34 are inserted into the slit portions 37.

Next, the action of the recording tape cartridge 10 having the above configuration will be described. When the recording tape cartridge 10 is not in use (during storage or during transport), the opening 18 is blocked by the door 50. Additionally, the brake member 80 is positioned in the rotationally locked position by the biasing force of the compression coil spring 98 to cause the brake gear 84 to engage with the engagement gears 48. For this reason, rotation of the reel 20 with respect to the case 12 is deterred.

When the recording tape T is to be used, the recording tape cartridge 10 is loaded front wall 12A first into the drive device along the direction of arrow A. Then, first the opening/closing member (not shown) disposed in the drive device engages with the tongue 56 of the door 50. Then, when the recording tape cartridge 10 moves further in the direction of arrow A in this state, the opening/closing member causes the tongue 56 to move relatively rearward counter to the biasing force of the coil spring 58. Then, the door 50 from which the tongue 56 projects slides rearward inside the groove portions 64 along the right wall 12B to open the opening 18.

In this manner, when the recording tape cartridge 10 is loaded a predetermined depth into the drive device and the opening 18 is completely opened, the recording tape cartridge 10 is lowered a predetermined height, and a positioning member (not shown) of the drive device is inserted into a positioning hole portion (not shown) formed in the lower case 16. Thus, the recording tape cartridge 10 is accurately positioned in a predetermined position inside the drive device, and further sliding of the door 50 (movement rearward) is limited.

Further, because of the downward movement of the recording tape cartridge 10, the rotating shaft relatively enters the gear opening 40 to cause the drive gear to mesh with the reel gear 44. Then, in accompaniment with operation where the drive gear meshes with the reel gear 44, the leg portions 94 projecting on the reel gear 44 are pushed up counter to the biasing force of the compression coil spring 98, the brake member 80 is pushed upward via the release member 90, and the brake gear 84 disengages from the engagement gears 48.

Then, in a state where the drive gear and the reel gear 44 are completely meshed, the reel plate 46 is attracted and held by the magnetic force of the annular magnet disposed inside the drive gear, whereby the reel 20 is placed in an unlocked state where it becomes relatively rotatable with respect to the case 12 inside the case 12 while the meshing of the reel gear 44 with respect to the drive gear is maintained.

Meanwhile, the pullout member disposed in the drive device enters the case 12 through the opened opening 18 and grips and pulls out the leader pin 30 positioned and held in the pin holding portions 36. At this time, the distal end portions of the plate spring 38 appropriately elastically deform to allow the leader pin 30 to escape from the pin holding portions 36, that is, to allow the large diameter portions 33 to escape from the concave portions 36A.

Further, at this time, because the recording tape cartridge 10 is accurately positioned inside the drive device, the hooks of the pullout member can be reliably caused to lock into the annular grooves 30A in the leader pin 30. Moreover, the reel 20 can rotate in accompaniment with the pulling-out of the leader pin 30 because the reel 20 has been released from its rotationally locked state.

In this manner, the leader pin 30 that has been pulled out from the opening 18 is housed in an unillustrated take-up reel. Then, the take-up reel and the reel 20 are driven to rotate synchronously, whereby the recording tape T is sequentially pulled out from the case 12 while being taken up on the take-up reel, and recording and playback of information is performed by a recording and playback head (not shown) disposed along a predetermined tape path.

When recording and playback of information ends and the recording tape cartridge 10 is to be ejected from the drive device, first, the rotating shaft reversely rotates, whereby the recording tape T is rewound onto the reel 20. Then, the recording tape T is completely rewound onto the reel 20 and the leader pin 30 is held in the pin holding portions 36, but at this time also, the distal end portions of the plate spring 38 appropriately elastically deform to allow the leader pin 30 to enter the pin holding portions 36—that is, to allow the neck portions 34 to enter the slit portions 37 and to allow the large diameter portions 33 to enter the concave portions 36A.

In this manner, the large diameter portions 33 are housed in the concave portions 36A and the second flange portions 35 are housed in the concave portions 36B, whereby the leader pin 30 is held in the vicinity of the opening 18 in the case 12. Then, the recording tape cartridge 10 is raised a predetermined height, the positioning member is pulled out from the positioning hole portion, the rotating shaft is pulled out from the gear opening 46, and the drive gear disengages from the reel gear 44.

Then, the brake member 80 and the release member 90 are pushed downward by the biasing force of the compression coil spring 98, the leg portions 94 of the release member 90 are inserted through the through holes 28A in the bottom wall 28 and project a predetermined height on the reel gear 44 from the undersurface of the bottom wall 28, and the brake gear 84 meshes with the engagement gears 48. Thus, the reel 20 is again placed in a rotationally locked state where relative rotation inside the case 12 is deterred.

Thereafter, the recording tape cartridge 10 is moved in the opposite direction of the direction of arrow A by an unillustrated ejecting mechanism. Then, in accompaniment with this movement, the door 50 is slid by the biasing force of the coil spring 58 in the direction in which the door 50 blocks the opening 18 to completely block the opening 18 (the door 50 returns to its initial state). In this manner, the recording tape cartridge 10 where relative rotation of the reel 20 with respect to the case 12 is locked and whose opening 18 has been blocked is completely ejected from the inside of the drive device.

Figure 7:
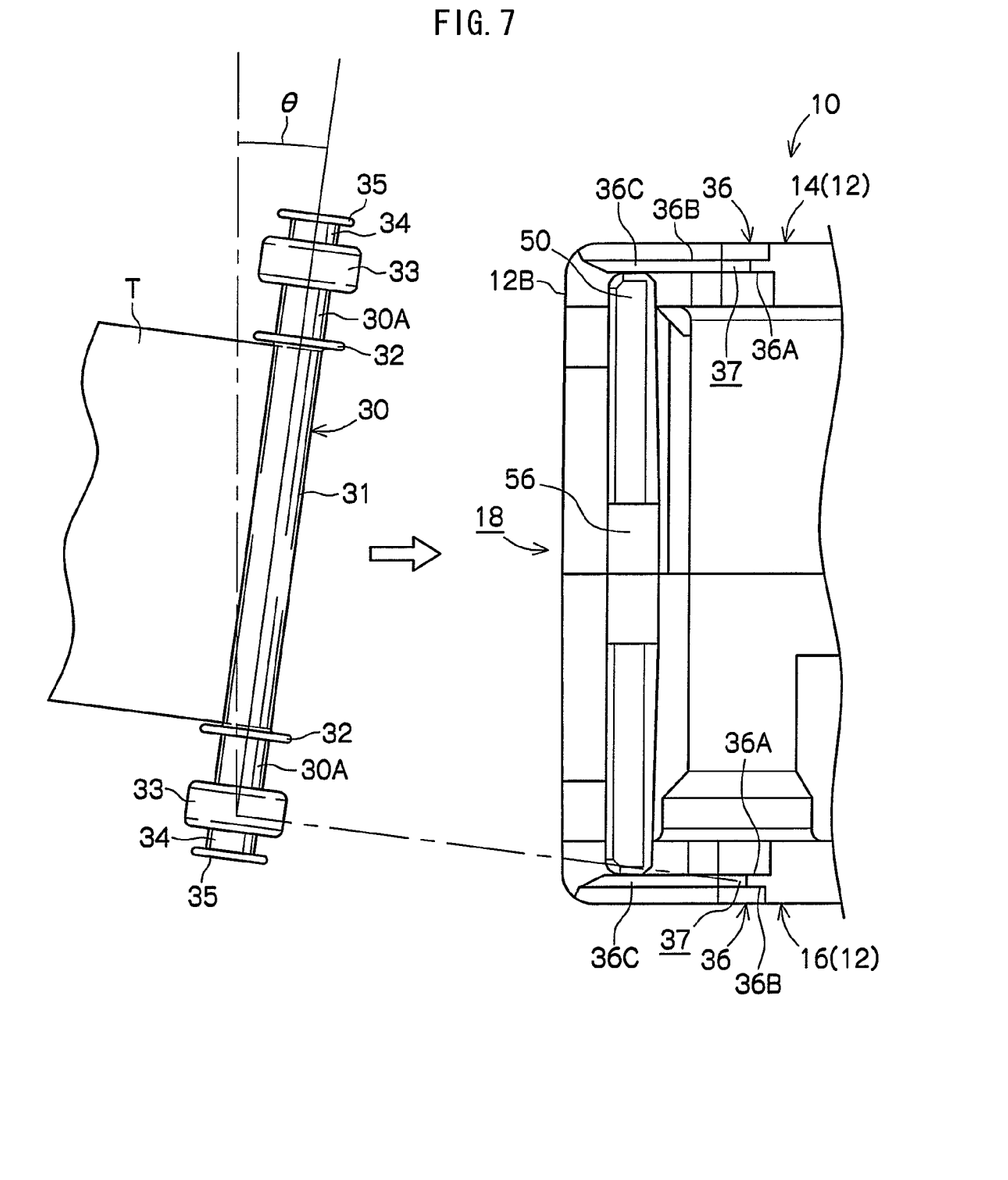
FIG. 7 is a general front view showing a state where the leader pin that is slanted a predetermined angle is returning to a case.

Here, as shown in FIG. 7, sometimes the leader pin 30 is returned to the pin holding portions 36 by the pullout member of the drive device in a state where the leader pin 30 is slanted a predetermined angle θ in the traveling direction thereof. However, because the outer diameter R4 of the second flange portions 35 is formed so as to be a predetermined amount smaller than the outer diameter R2 of the large diameter portions 33, as shown in FIG. 8 and FIG. 9, even when the inner surface of one of the second flange portions 35 contacts the corresponding thin portion 36C, the outer end surface 33A of the large diameter portion 33 does not contact the thin portion 36C (the thin portion 36C does not bite into the area between the second flange portion 35 and the large diameter portion 33).

To describe a specific example thereof using actual numerical values, in an instance where the height H of the opening 18 is 16 mm and the position where the leader pin 30 is held in the pin holding portions 36 is a position 7 mm from the front wall 12A of the case 12 and 5 mm from the opening 18, when the length L1 between the outer end surfaces 33A of the large diameter portions 33 is 19.46 mm, the outer diameter R2 of the large diameter portions 33 is 3.2 mm, the outer diameter R4 of the second flange portions 35 is 2.2 mm, the plate thickness D1 of the second flange portions 35 is 0.2 mm, the length L2 of the neck portions 34 is 0.7 mm, the plate thickness D2 of the thin portions 36C is 0.4 mm, and the depth F of the concave portions 36B is 0.5 mm, as long as the angle of inclination θ of the leader pin 30 with respect to the height direction of the case 12 is no greater than 7.5°, a drawback where the second flange portion 35 catches on the thin portion 36C such that the leader pin 30 becomes unable to be returned to the pin holding portions 36 does not arise.

Figure 8:
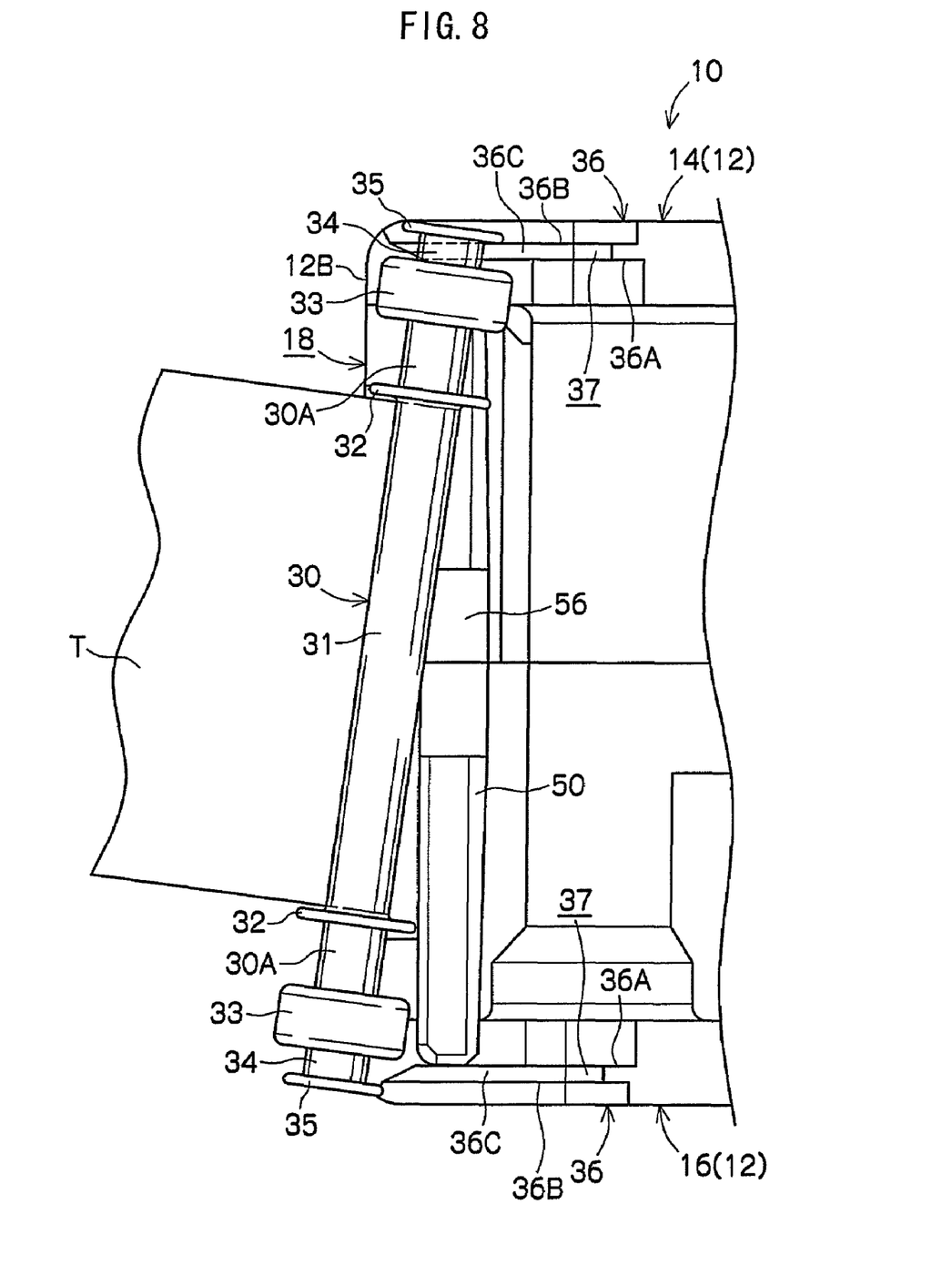
FIG. 8 is a general front view showing a state where the leader pin that is slanted a predetermined angle has begun to enter the case.
Figure 9:
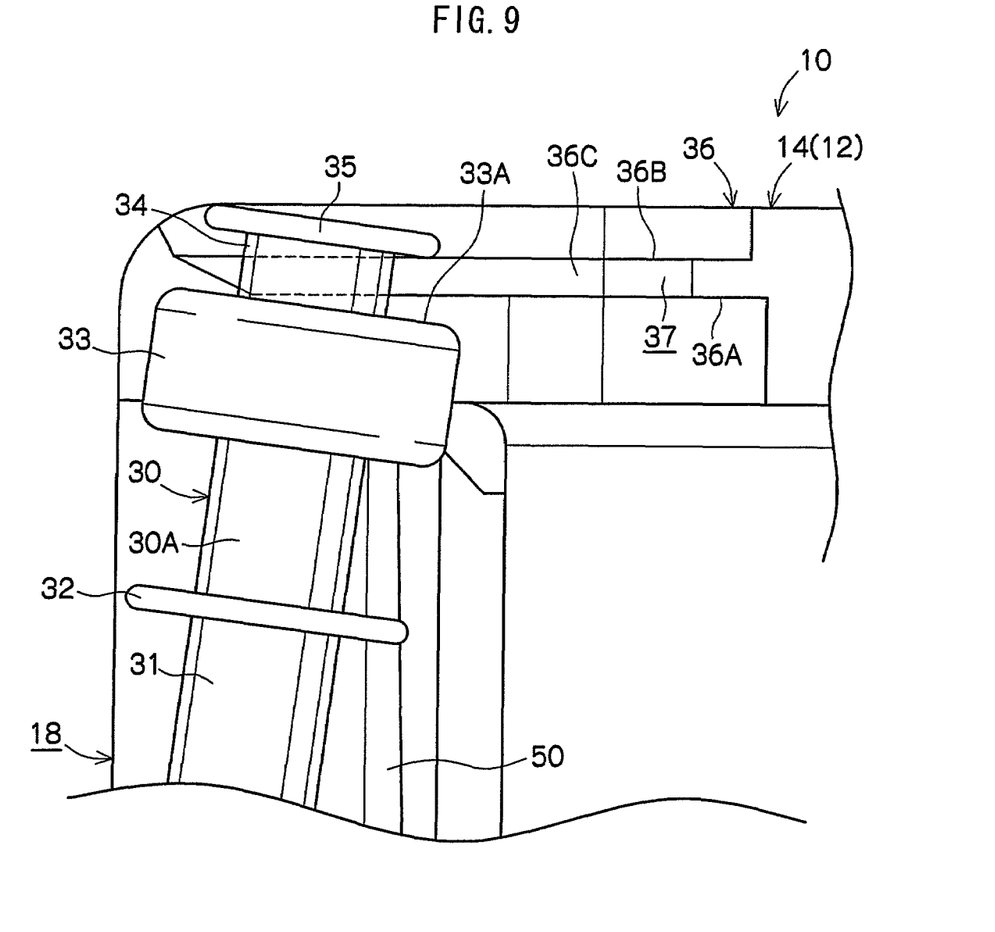
FIG. 9 is an enlarged general front view showing part of FIG. 8.
Figure 10:
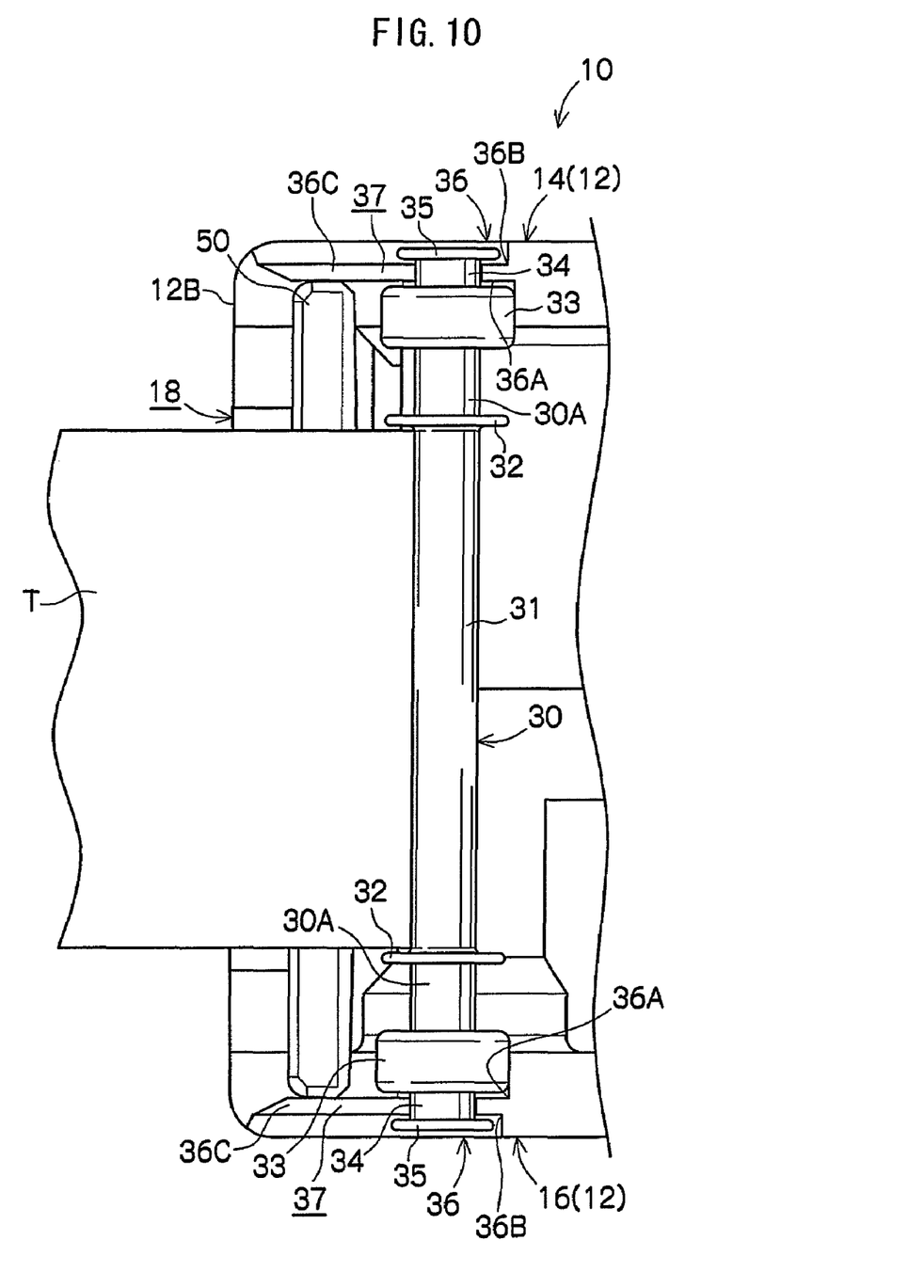
FIG. 10 is a general front view showing a state where the leader pin is held in the case.

That is, as shown in FIG. 8, when the leader pin 30 continues to enter the pin holding portions 36 with the angle of inclination θ being equal to 7.5°, the neck portions 34 enter the slit portions 37 and the orientation of the leader pin 30 is corrected by the second flange portion 25 that contacts the outer surface of the upper thin portion 36C in the drawing and by the large diameter portion 33 that contacts the inner surface of the lower thin portion 36C in the drawing, so as shown in FIG. 10, the second flange portions 35 become housed in the concave portions 36B and the large diameter portions 33 become housed in the concave portions 36A. In other words, the leader pin 30 is held in an upright state in the height direction of the case 12 in a predetermined position (parking position) in the pin holding portions 36.

In this manner, even when the leader pin 30 is returned to the pin holding portions 36 in a state where the leader pin 30 is slanted a predetermined angle θ (in this instance, no greater than 7.5° with respect to the height direction of the case 12) in the traveling direction thereof, the second flange portion 35 does not catch on the thin portion 36C (the thin portion 36C does not bite into the area between the second flange portion 35 and the large diameter portion 33) because the outer diameter R4 of the second flange portions 35 is formed so as to be a predetermined amount (in this instance, 3.2 mm−2.2 mm=1.0 mm) smaller than the outer diameter R2 of the large diameter portions 33, and the leader pin 30 can be reliably returned to the pin holding portions 36.

It will be noted that when the above-described dimension of each portion changes, the angle of inclination θ of the leader pin 30 at which the leader pin 30 can enter the pin holding portions 36 without the second flange portions 35 catching on the thin portions 36C (without the thin portions 36C biting into the areas between the second flange portions 35 and the large diameter portions 33) also changes. However, in the recording tape cartridge 10 configured at least to have the above-described dimensions, by making the forward inclination with respect to the traveling direction of the leader pin 30 plus (+) and the rear inclination minus (−), return of the leader pin 30 to the pin holding portions 36 can be sufficiently allowed as long as the angle of inclination θ is no greater than ±7.5°.

In addition, it suffices for the recording tape T pertaining to the present embodiment to be understood as an elongate tape-like information recording and playback medium capable of recording information and playing back recorded information, and it goes without saying that the recording tape cartridge 10 (the reel 20) pertaining to the present embodiment is also applicable to recording tape T of all kinds of recording and playback systems.

What is claimed is:

1. A recording tape cartridge comprising:
   a case that rotatably houses a single reel onto which is wound recording tape having a leader pin attached to an end portion thereof, which case includes a side wall at which is formed an opening for allowing the leader pin to be pulled out; and
   holding portions that are formed at a top plate and a bottom plate of the case and which hold the leader pin in the vicinity of the opening,
   wherein:
   the leader pin includes, at both ends of a body portion, large diameter portions having an outer diameter that is larger than the outer diameter of the body portion and flange portions disposed at the large diameter portions via neck portions having an outer diameter that is smaller than the outer diameter of the large diameter portions;
   the holding portions include slit portions that open towards the opening and into which the neck portions are capable of entering, first concave portions that are formed at inner surface sides of the slit portions and which are configured to house the large diameter portions, and second concave portions that are formed at outer surface sides of the slit portions and which are configured to house the flange portions; and
   the flange portions are formed so as to have an outer diameter that is smaller than the outer diameter of the large diameter portions, so that the leader pin is configured to be housed in the holding portions when the leader pin is returned to the holding portions in a state in which the leader pin is slanted at a predetermined angle with respect to a take-up direction of the recording tape.

2. The recording tape cartridge of claim 1, wherein sides of the slit portions facing the opening are enlarged to open out in a tapered manner.

3. The recording tape cartridge of claim 1, wherein the flange portions are positioned at axial direction end portions of the leader pin and the large diameter portions are positioned at inner sides of the flange portions, with the neck portions being interposed between the flange portions and the large diameter portions.

4. The recording tape cartridge of claim 1, wherein the leader pin further includes a pair of additional flange portions separated by a distance substantially corresponding to the width of the recording tape to which the leader pin is attached, and the pair of additional flange portions are positioned between the large diameter portions.

5. The recording tape cartridge of claim 1, wherein the first concave portions, the second concave portions and the slit portions include substantially semicylindrical peripheral surfaces configured to respectively house the large diameter portions, the flange portions and the neck portions of the leader pin.

6. The recording tape cartridge of claim 1, wherein the second concave portions are formed at outer surfaces of the case of the recording tape cartridge and allow the flange portions to be exposed therefrom in a state in which the leader pin is held in the holding portions.

7. The recording tape cartridge of claim 1, wherein the first concave portions are formed so as to open towards the inside of the recording tape cartridge.

8. The recording tape cartridge of claim 1, wherein the slit portions include thin plate-shaped regions having a predetermined thickness, and the thickness of the regions is shorter than an axial direction length of the neck portions of the leader pin.

* * * * *